Figure 1:
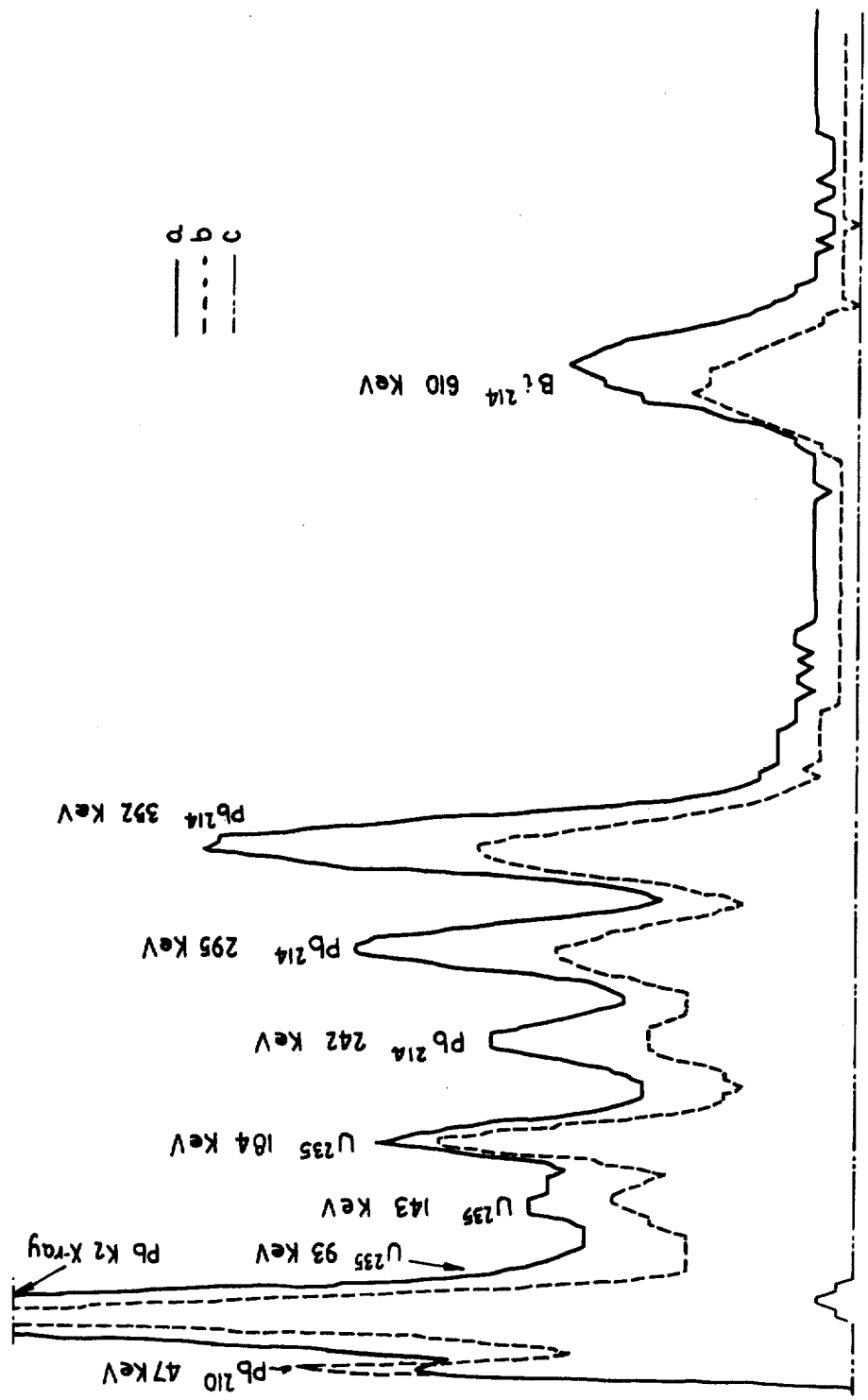

United States Patent [19]

McLaughlin

[11] 4,159,308

[45] Jun. 26, 1979

[54] MINERAL TREATMENT

[75] Inventor: Robert J. W. McLaughlin, Alphington, Australia

[73] Assignee: The University of Melbourne, Parkville, Australia

[21] Appl. No.: 695,416

[22] Filed: Jun. 14, 1976

[30] Foreign Application Priority Data

Jun. 30, 1975 [AU] Australia .............................. PC 2157
Apr. 27, 1976 [AU] Australia .............................. PC 5705

[51] Int. Cl.$^2$ ............................................. C01G 56/00
[52] U.S. Cl. ......................................... 423/20; 423/3; 423/11; 423/18
[58] Field of Search .................. 423/3, 11, 18, 84, 20; 75/84, 97

[56] References Cited

U.S. PATENT DOCUMENTS

| | | | |
|---|---|---|---|
| 2,894,804 | 7/1959 | Sawyer et al. | 423/3 X |
| 3,577,225 | 5/1971 | Shaffer et al. | 423/3 X |
| 3,761,564 | 9/1973 | Mailen et al. | 423/3 |
| 3,781,403 | 12/1973 | Baes, Jr. et al. | 423/3 |
| 3,976,775 | 8/1976 | Tallent | 423/20 X |

*Primary Examiner*—Benjamin R. Padgett
*Assistant Examiner*—Josephine L. Barr
*Attorney, Agent, or Firm*—Cushman, Darby & Cushman

[57] ABSTRACT

The addition of a normally insoluble fluoride to a reaction being a chemical treatment process provides a surprisingly improved rate is dissolution in many cases. Specifically, where the fluoride is added to a reaction using hydrochloric acid or ferric chloride, the yield is more rapid than has previously been shown in the art. The invention is most applicable where the stability constant of the fluoride or fluoride complex of the element to be recovered is higher than that of the cation with which the fluoride is originally associated.

22 Claims, 3 Drawing Figures

MINERAL TREATMENT

This invention relates to the treatment of mineral containing materials and is specifically designed for beneficiating natural ores, synthetic mineral ores, slags and other residues from mineral processing as well as ores given a preliminary treatment to render processing more facile.

A great deal of mineral treatment presently being used throughout the world is pyrometallurgical by which processes there can be formed elements, their oxides and other subsidiary compounds. In these processes the naturally occurring or artificially produced substance is heated to high temperatures, usually in a reducing environment, to obtain the required end product.

These processes generally use a great deal of energy thus adding to the cost of production of the required compound and, at the same time, other valuable compounds may be left in the residue and may well be not recovered.

For example, slags produced during the smelting of tin-bearing minerals often have notable tantalum contents and also significant quantities of other valuable metals but unless such values are high, such slags are often rejected, as the percentage of these metals is not sufficient to justify high energy treatment for their recovery.

The principal object of the present invention is to provide improved methods of treating mineral containing materials which may be natural ores or which may be artificially formed to recover, economically, a high percentage of the valuable elements therefrom.

The invention in one aspect provides a method of obtaining materials including treating the material in conditions where the pH is lower than 7 and in the presence of a source of fluoride ions or complex fluoride ions to thereby dissolve the material and separating the required metals or their salts or their chemical complexes from the resultant liquid.

More specifically, the invention relates to the treatment of the material in the presence of an acid, preferably hydrochloric acid, in the presence of a normally insoluble fluoride, preferably calcium fluoride.

In another aspect of the invention, the mineral containing material is treated in conditions where the pH is lower than 7 with a salt of a metal which has a stability constant ($\log_{10}\beta_1$) relative to fluoride between that of the cation of the source of fluoride ions and the metals or metal salts or their chemical complexes to be recovered.

The required pH may be obtained by using a salt which itself exhibits acid properties in aqueous solution under certain conditions or the required pH can be generated by the addition of chemical compounds, which may be gasses which themselves may take no part in the reaction.

Preferably the reaction takes place with the reactants being heated, preferably to a temperature not exceeding boiling.

We may if required, activate the mineral containing material to increase reactivity before adding the other components. One form of activation is by heating.

The insoluble fluoride can be in an impure form such as fluorite or, in certain circumstances where phosphate precipitation does not occasion problems, fluorapatite, or indeed a complex species such as a silicofluoride. The invention is particularly applicable for use with elements whose fluorides or complexes including fluorides have high stability constants, for example, titanium, aluminium, cerium, tantalum, uranium, plutonium, thorium, zirconium, antimony and nobium.

The invention is also very useful for the recovery of other metals, their salts, or complexes where these metals are normally held in an intractable lattice. For example, the main ores of lithium are spodumene, lepidolite, amblygonite and petalite, all of which contain aluminium in the mineral lattices. We find that the aluminium forms fluorides and complexes which frees the lithium ion ($Li+$) and during later treatment a lithium salt can be separated. Provided the conditions are controlled the insoluble lithium fluoride is not formed to any great extent.

Similarly many other elements can be freed from a lattice provided there is an element with a high stability constant for element to fluoride present.

We find that the solubility of the insoluble fluoride is increased remarkably and unexpectedly and with this increase of solubility so there is corresponding solution of a number of elements which are contained in substances which may include naturally occurring minerals, artificially formed minerals, mineral slags, mineral residues, etcetera. Once the crystallographic lattice of a substance is attacked, we find that elements present in the structure which do not have high stability constants for fluorides may also become soluble, as the process is normally operated with an excess of acid or other solvent and they become open to attack by the solvent solution. For example, feldspar is attacked, the aluminium being complexed while the alkali metals also go into solution.

When using acid, we prefer in the process to use hydrochloric acid, partially because of its cost advantage over more exotic acids, and also partly because of the relative ease of treatment of the chlorides or complexes containing chlorine and also because of the relative ease with which hydrochloric acid can be recovered using conventional processes.

Where a metal salt is being used as a solvent, we prefer to use a ferric ($Fe^{3+}$) salt, which has a stability constant of approximately 5 which is intermediate between that of calcium and the element to be extracted, e.g. zirconium for which $\log_{10}\beta_1$ is approximately 9. The preferred salt is ferric chloride. In order to stop the precipitation of ferric oxide, we prefer to add a certain amount of acid, preferably hydrochloric acid, although this can be added in very small amounts.

It is to be understood that other elements or compounds may also be used under certain circumstances to control the oxidising or reducing capacity of the solution, the only prerequisite being that the stability constant of any complex formed is higher than that of calcium with respect to the fluoride ions and lower than that of the element to be extracted.

Although for several reasons, particularly to overcome handling problems, we prefer to use a normally insoluble fluoride, the invention also includes the use of other fluorine containing compounds.

Practically, we prefer not to use a mixture of, say, hydrochloric acid and hydrofluoric acid, as although the mixture is highly reactive, the cost of hydrofluoric acid is high and thus the economies of such a process are not good and the cost of the materials of construction of the reaction vessel could be extremely high because of the general corrosiveness of the mixture.

The use of the normally substantially insoluble material is very beneficial, as the fluoride ions are only taken into solution as those already in solution react thereby maintaining the equilibrium conditions so there is, at no time, any great quantity of free and active fluoride ions in the system.

As the reaction proceeds, there may eventually be secondary reactions in which hydrolysis of some of the dissolved material is induced, either because of a rise in the pH value, a rise in the temperature or by seeding or by any other known means. Once hydrolysis has occurred it can on occasions be rather difficult to redissolve the precipitate and this material may have to be treated separately from the elements held in solution.

When using acid as a solvent, we have found that such elements as antimony, tungsten, niobium and tantalum can precipitate as complexes and care must be taken to control the acidity and temperature if it is not required to precipitate these elements, or alternatively by modification of acidity or temperature or by hydrolysis, selective precipitation can be achieved. The precipitates may well be in the form of oxides, oxy fluorides, oxyhydroxy fluorides, oxychlorides, oxyhydroxy chloride, etc., and the actual form of precipitate will depend on the precipitation conditions.

To cause separation of the elements or their compounds, when it is required, any known techniques such as volatilization, precipitation, complexing, ion exchange and any other techniques may be used.

The precipitated metal compounds may be processed by a variety of known methods to separate valuable mineral values from other components, such as iron, that are of less value. A separation such as this is easier in most cases than an attempt to separate oxides, etc., from the solids resulting from acid regeneration since here, unless conditions are rigorously controlled, the heated oxides etc. may well become intractable to acids and other types of processing.

It may be desirable to alter the pH or ionic strength of the solution to increase the precipitate yield and to facilitate the separation of the precipitate from the remainder of the solution and to re-treat the precipitate and the solution either with acid or alkali or in other ways to obtain the mineral values therefrom. As example here is the ready precipitation of tantalum values from tantalum containing ores, slags or other tantalum containing residues.

The acid can be recovered by the use of conventional acid recovery plants or, for example, by using magnesium carbonate or magnexium oxide.

In a known process, acidified iron rich chlorides are passed through a magnesium oxide or carbonate bed. This causes neutralization so that all of the chloride values appear as magnesium chloride and this is suitable for acid regeneration.

We believe that the action of the fluoride is as a replacement. Calcium fluoride is considered not very soluble in acids unless there is some volatility. When, however, there is another substance present for which the stability constants of its fluorides or fluoride complexes are higher than for calcium fluoride, even at low solubility, such as 0.5% (the factor determined experimentally for mineral fluorite in hydrochloric acid of 33% concentration), the fluoride ion is competed for by the other element. Thus, where the stability constant of the compound or complex MF, where M is the element and F is fluoride, is higher than for $CaF_2$, there will be an effective increase in fluorite solubility as the fluoride ion is removed from its association with calcium and to approach equilibrium solubility more fluorite must dissolve. Similarly, it will be seen that there are a variety of other fluorides or complexes, e.g. silicofluorides where similar effects may be produced.

The stability constant for calcium fluoride is very low, in the literature $\log_{10}\beta_1$ is given as 0.63, compared to the stability constant of such elements as zirconium which is given as 8.8, thorium as 7.8 and uranium as 7.2 and thus, where these elements are present, the fluorite will rapidly go into solution provided the mineral lattice is in the structure suitable for attack.

As will be described later herein, we can use the ferric ion ($Fe^{3+}$) as an intermediate in dissolving other ions which, in turn, have a stability constant higher than the $Fe^{3+}$ ion, that is higher than about 5. The principle here is one of rendering the insoluble fluoride soluble and thus speeding reactivity. Such a course has obvious advantages with certain intractable minerals such as zircon.

There are a number of volatile fluorides, and elements having such volatile fluorides can also react differently because of the exclusion of the volatile fluoride at the temperature of operation.

Some elements, such as zirconium in zircon have a very stable mineral lattice and thus in naturally occurring minerals, these may not be dissolved or there may be only very slight dissolution using acid and fluorite but we have, as will be discussed later, found that these can be dissolved more rapidly under certain conditions, if an intermediate, such as the $Fe^{3+}$ ion is present. On the other hand, we have found that such elements, when in a glassy slag, become quite soluble and solubility may also be enhanced in a slag which is not glassy and, of course, when minerals are in a metamict state or a different modification either crystalline or amorphous as a result of heating above the inversion temperature or a decomposition temperature.

In order that the invention can be generally understood, we shall describe specific illustrative embodiments of the invention.

In the first of these, a glass slag from a tin-smelting works was examined qualitatively by X-ray fluorescence and it was found to contain appreciable amounts of niobium, zirconium, iron, titanium, silicon and calcium and minor, but nonetheless, important amounts of tin, yttrium, cerium, lanthanum and other rare earth elements, thorium, tungsten and tantalum. There are also a variety of other elements in even smaller amounts again, for example, uranium.

The glassy slag was finely ground to provide a large surface area to increase reactivity. 250 grams of the ground slag was mixed with 60 grams of raw fluorite, which was unbeneficiated material and thus contained the normal impurities such as quartz, and 2.5 liters of 33% hydrochloric acid.

The mixture was boiled with stirring for one hour and during this time 26.8% of the original material was dissolved.

We repeated this experiment at 90°-95° C. and found a 43.6% dissolution.

We then again repeated the experiment using boiling with a 25% acid and found that there was a solubility of 23.6%.

In each case, a fine precipitate occurred during reaction.

The solution was separated from the residues. The solution derived at under boiling temperature was caused to precipitate by normal hydrolysis methods, such as heating, and we found that copious precipitate was formed.

This precipitate was examined by X-ray fluorescence analysis and was shown to contain a large quantity of niobium and tantalum. The actual structure of the precipitate has not been completely investigated but it appears to be a non-stoichiometric mixture of the oxides, oxy and hydroxy compounds of the elements and also the oxy halides and oxyhydroxy halides. On examining the relative proportions of the tantalum compared to the niobium, we find that the precipitate has a greatly enriched tantalum content compared to the niobium content, the enrichment being relative to the relative percentages in the original material. We then evaporated the solution until hydrolysis again occurred, and at this time the insoluble material consisted mainly of a mixture of the values of the elements tin, titanium, iron and thorium. The percentage of these was greater in the liquor from the experiment conducted at boiling point and we found that there were less niobium, tantalum, zirconium, and tungsten relative to that obtained in the experiment conducted at the lower temperature.

We have further experimented with the tantalum values and have demonstrated that a long period of contact at the higher temperature first mobilizes the tantalum and then, subsequently, whilst dissolution is still being effected, there is the commencement of precipitation, as mentioned before, and the tantalum is largely precipitated at that time. Thus, where the tantalum values are to be separated from an ore, it is desirable to maintain the temperatures at below boiling point, unless a specific complexing agent is added to inhibit precipitation, for example tartrate, etcetera.

When the liquor from the experiment using the lower temperature is heated to a higher temperature, there is a precipitation which is largely of the niobium and tantalum values.

We have also found that with the residue remaining from the experiment conducted at high temperatures a series of extractions are possible. As stated previously, the high temperature extraction first makes soluble and then precipitates values of elements such as niobium, tantalum and tungsten. These values may be rendered soluble by, for example, concentrated sulphuric acid with a suitable known complexing addition. The advantage of this process resides in that the preliminary digestion removes interferring elements so that valuable and relatively pure amounts of, say, tantalum can be obtained.

We then carried out a further series of experiments using the mineral stibiotantalite which came from Greenbushes in Western Australia. This mineral was subjected to a processing similar to that previously described. We found that during dissolution the maximum solubility obtained was 36%, because once more than this percentage was dissolved there was a precipitation of the type described hereinbefore.

Table 1, hereinafter, is a table showing the solubility of stibiotantalite under various conditions and also the solubility of a tin slag and a steel slag. it can be seen from the stibiotantalite tests that where no fluorite is used, the solubility is very low and these tests also demonstrate the reprecipitation referred to, for example, where a mixture is boiled for three hours even with different quantities of fluorite. A similar anomaly can be seen with relation to the tin slag.

Table 1.

| Material | Acid % | Fluorite g | Time (hrs) | Temp. C.° | Solubility % |
| --- | --- | --- | --- | --- | --- |
| Stibio-tantalite | 20 | 4 | 1 | 75–85 | 9.2 |
|  | 25 | 4.64 | 1 | 75–85 | 12.8 |
|  | 33 | — | 1 | 75–85 | 0.2 |
|  | 33 | 6 | 3 | 90–95 | 36.0 |
|  | 33 | 6 | 3 | B.P. (107–109) | 15.6 |
|  | 33 | 6 | 1 | B.P. | 28.0 |
|  | 33 | 12 | 3 | 90–95 | 12.4 |
|  | 33 | 12 | 3 | B.P. | 12.4 |
| Tin Slag | 25 | 6 | 1 | B.P. | 23.6 |
|  | 33 | 6 | 1 | B.P. | 52.0 |
|  | 33 | 6 | 1½ | B.P. | 26.8 |
|  | 33 | 6 | 1½ | 90–95 | 43.6 |
| Steel Slag | 25 | 4.64 | 1 | 75–85 | 46.4 |

Antimony, as would be expected, was found to be extremely soluble. When the liquor was clarified and water was added thereto, niobium and tantalum values were precipitated out. Also, we have found that the solid residues from the dissolution reaction contained fine material with a high tantalum and niobium value.

This fine material is amenable to other treatments. For example, we have found much of the material can be dissolved in sulphuric acid and other chemical methods of solution can also be used. Recovery processes of this type were discussed hereinbefore.

We have found that slag type materials, particularly when in the glassy state, are highly reactive and for some minerals it may be desirable to obtain a slag by suitable fluxing processes but without necessarily using the energy that would be required to obtain a metal or its oxide.

The slag thus obtained can be treated by the invention at relatively low temperatures, and normally at atmospheric pressures to dissolve, and to subsequently precipitate the values of a variety of elements which are of commercial value. An example of such a procedure would be the slagging of cassiterite and subsequent extraction of the tin values. Yet another would be the slagging of zircon with, for example, caustic soda. The slagged mass, after leaching free of sodium hydroxide and silicate, it then processed. The eventual hydrolysis precipitate is a mixture of oxide, oxy hydroxy fluoride, etc., and on heating will give zirconium tetra fluoride plus oxide, etc. This offers a route to zirconium metal by known processes.

As previously mentioned, the invention can be applied in a slightly different way by using a two stage or 'piggy-back' process.

This process relies on the differences in stability constants between the original material, an intermediate material, and the material which is to be recovered. Assuming the use of fluorite, having a stability constant of 0.63 for calcium with respect to the fluoride ion as given in the literature, we can use as an intermediate ferric iron ($Fe^{3+}$) which has a stability constant of approximately 5 in order to attack the materials having extremely high stability constants such as, for example, uranium, plutonium, thorium and zirconium.

The ferric ion is introduced into the system, preferably as a solution of ferric chloride, although other salts may also be used, and this reacts with the calcium fluoride in the fluorite so the fluorite tends to dissolve and ferri-fluorides and other complexes are formed. If there is an element in the system having a higher stability constant than ferric iron, then this will take up the fluoride ions from the ferri-fluoride and other complexes to form a fluoride or complexes of the element.

Specifically if there is, say, uranium and zirconium in the system these will take up the fluoride from the ferri-fluoride and other complexes and form uranium and zirconium fluorides and complexes such as oxy, oxyhydroxy, oxyhydroxy halide and others or as higher oxidation complexes should oxidizing and other conditions be suitable.

We have found that using such a system, there is a faster dissolution of the required element compared to what has previously been possible.

Table 2 illustrates the invention, both in its general sense, as far as the beryls are concerned, and in the more limited sense, as far as the other materials are concerned. In this table the acid used in each case is hydrochloric acid, and the mixture was boiled for one hour.

ml of 20% hydrochloric acid, 1 g of calcium fluoride and again we had dissolution after 5 minutes boiling.

Previously, in order to dissolve pitchblende, it was desirable to heat, for relatively long periods, a concentrated acid in which the pitchblende was placed, so it can be seen that either aspect of the invention is vastly superior to the prior art processes.

We have found that by oxidizing the uranium tetrafluoride and other complexes formed during the reaction, it is possible to form uranium hexafluoride and this is, of course, a most valuable material commercially, being a starting point for the manufacture of nuclear reactor feeds. If the uranium tetrafluoride is placed in an electrolytic bath, uranium will be attracted to the cathode and this may be a direct method of obtaining pure uranium metal. It will be appreciated that the iron is also attracted to the cathode but because of the presence

TABLE 2

| Sample | Wt (g) | Acid conc. % | Vol (ml) | $CaF_2$ | Additions | Residue wt (g) | % Dissolved | Wt of material from Sol |
|---|---|---|---|---|---|---|---|---|
| ZIRCON | 25 | 25 | 250 | 20 | 10g $FeCl_3$ | 19.2 | 23.2 | 7.0 |
| CHROMITE | 25 | 25 | 250 | 12 | 6g $FeCl_3$ | 21.9 | 12.4 | 1.9 |
| CASSITERITE | 25 | 25 | 250 | 12 | 6g $FeCl_3$ | 23.8 | 4.8 | 2.8 |
| FLUORITE B.P. | 25 | 25 | 250 | 12 | 6g $FeCl_3$ | — | | |
| FLUORITE NATURAL | 25 | 25 | 250 | 25 | 6g $FeCl_3$ | 10.4 | 58.4 | 2.1 |
| MONALITE | 25 | 25 | 250 | 12 | 6g $FeCl_3$ | 22.2 | 11.2 | 3.0 |
| GALENA | 25 | 25 | 250 | 12 | 6g $FeCl_3$ | 21.3 | 14.8 | 5.0 |
| LEAD OXIDE | 25 | 25 | 250 | 12 | 6g $FeCl_3$ | 22.5 | 10 | |
| W. AUST. BERYL | 10 | 12.5 | 100 | 4.8 | — | 9.6 | 4 | 9.4 |
| BROKEN HILL BERYL | 10 | 12.5 | 100 | 4.8 | — | 8.9 | 11 | 8.1 |
| BROKEN HILL BERYL | 10 | 12.5 | 100 | — | — | 9.7 | 3 | — |
| BROKEN HILL BERYL | 10 | 12.5 | 100 | 20 | — | 19.8 | | 19.2 |

In Table 2, the use of ferric chloride ensures that the fluoride will dissolve (apart from any residual siliceous material, etc.). This means that the weight of residues gives a fairly accurate measure of the amount of solution that has taken place. It is important to recognise that with light elements such as beryllium, that a considerable amount of fluoride is needed. For example, in the mineral beryl $Be_3Al_2(SiO_3)_6$ we have Be=5.05% and Al=10.05% approximately and so since a beryllium to fluoride ratio of approximately 9:38 exists and for aluminium the ratio is of the order 27:114. Assuming that in say fluorite the fluoride constitutes 50% (it is normally less since most ordinary fluorites are often less than 60% $CaF_2$) then obviously a considerable amount of fluorite, or any other complex fluoride will be required to get a total reaction proceeding past the first stability constant state.

For exemplification, we carried out the following experiment:

5 g of pitchblende was added to 100 ml of 20% ferric chloride solution and 1 g of calcium fluoride. The mixture was boiled and after 5 minutes boiling, there was complete dissolution of the pitchblende.

It was found there tended to be a slight precipitation of ferric oxide and in order to overcome this, we simply added a small quantity of dilute, 6 to 7% hydrochloric acid. The same experiment was carried out using a 100 of acid in the solution, the iron would be immediately dissolved and would not contaminate the uranium obtained. Of course, in such a process there is no need to add ferric chloride.

The use of a salt rather than an acid as the dissolving agent and also to provide ions for an intermediate can have great value in even more intractable minerals than pitchblende and not only has it proved successful for other uranium bearing ores, it can also be used with zircon, which is zirconium silicate and is normally considered very intractable but it can be dissolved by using this aspect of the invention since the 'piggy back' process in essence takes more fluoride or complex fluorides into solution and more fluoride therefore becomes available for reaction. By dissolving zircon by the use of the process, pure zirconium can be recovered by suitable processing of the halide complexes formed.

In the mining of uraniferous ores, known methods of separation of uranium leave behind in the tailings the majority of the highly radioactive constituents. Such tailings, as they are often finely ground are relatively readily leached by surface waters. Such leachings present a considerable hazard to the environment, since it is generally recognized that such leaching will be rapid where material has been ground.

Figure 2:
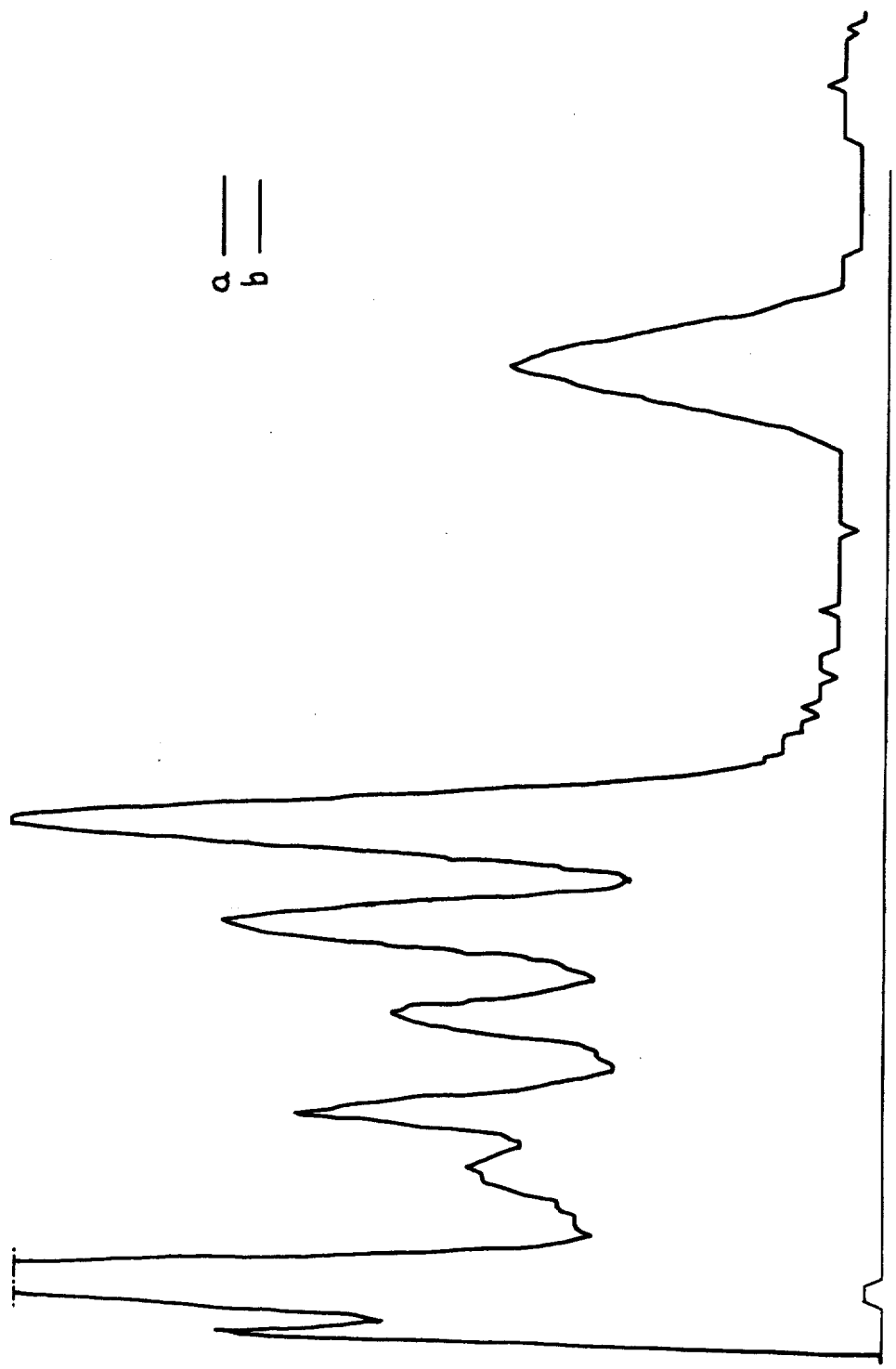
Figure 3:
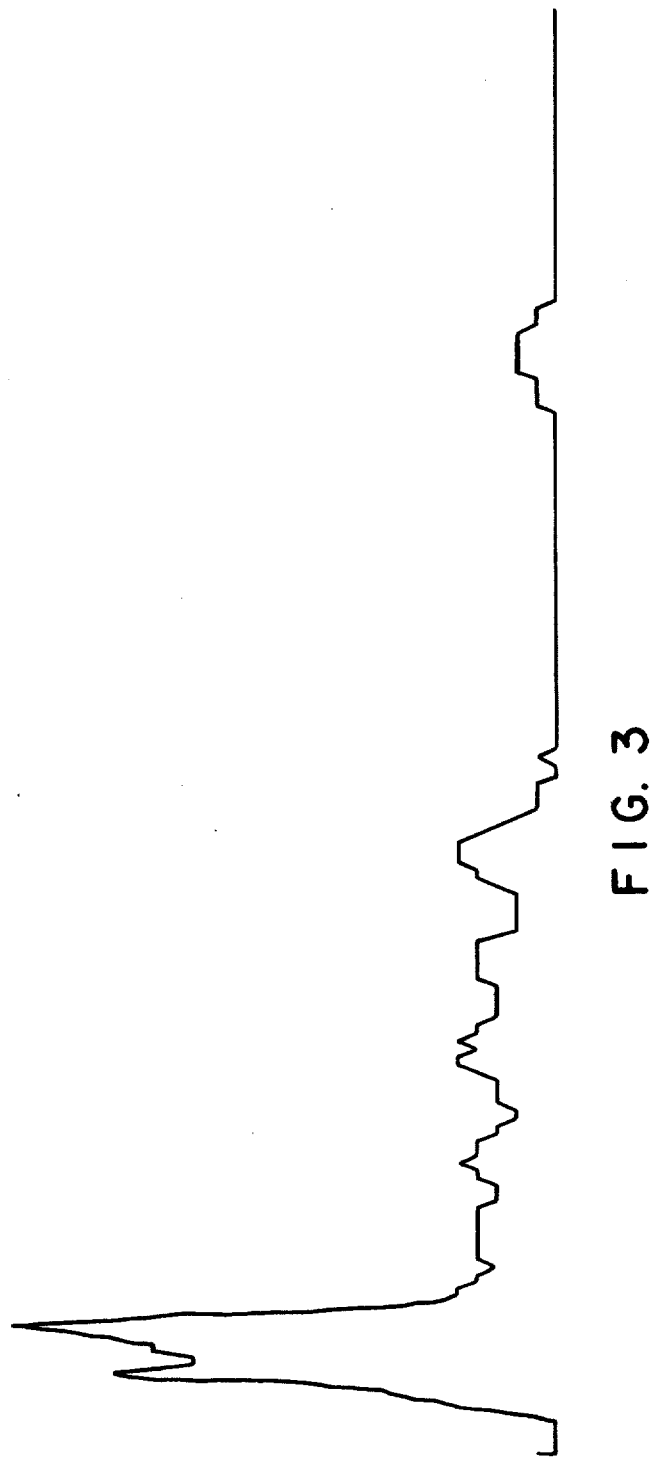

This aspect can be observed from consideration of Table 3 and the attached graphs in FIGS. 1 through 3.

TABLE 4

| Sample | Weight (g) | Acid | Conc. % | Vol (ml) | $CaF_2$ (g) | Additions | Time | Residue Weight | Diss | Wt.Sol | % U |
|---|---|---|---|---|---|---|---|---|---|---|---|
| SA 21 Sth. Alligator Drum | 25 | HCl | 10 | 250 | — | | 5 mn | 22.5 | 10 | | 1.214 |
| SA 22 Sth. Alligator Drum | 25 | HCl | 7 | 250 | 6 | | 5 min | 20.1 | 19.6 | | 0.022 |
| SA 23 Sth. Alligator Drum | 25 | HCl | 7 | 250 | — | | 5 min | 22.7 | 9.2 | | 1.842 |
| SA 24 Sth. Alligator Drum | 25 | HCl | 5 | 250 | 6 | | 5 min | 22.0 | 12 | | 0.047 |

TABLE 4-continued

| Sample | Weight (g) | Acid | Conc. % | Vol (ml) | CaF$_2$ (g) | Additions | Time | Residue Weight | Diss | Wt.Sol | % U |
|---|---|---|---|---|---|---|---|---|---|---|---|
| SA 25 Sth. Alligator Drum | 25 | HCl | 5 | 250 | — | | 5 min | 23 | 8 | | 2.327 |
| SA 26 Sth Alligator Drum | 25 | HCl | 1 | 250 | 12 | 35g NaCl | 1 hr | 31.9 | | | 0.034 |
| SA 27 Sth. Alligator Drum | 25 | H$_2$SO$_4$ | 10 | 250 | — | 2g MnO$_2$ | 1 hr | 23.3 | | | 0.048 |
| SA 28 Sth. Alligator 15 Residue | 10 | HCl | 5 | 200 | 2.6 | | 15 min | 8.2 | | | 0.017 |
| D1 Davidite | 10 | HCl | 10 | 200 | 2 | | 1 hr | 5.6 | 44 | | 0.069 |
| D2 Davidite | 10 | HCl | 10 | 200 | — | | 1 hr | 6.5 | 35 | | 0.118 |
| Br 1 Brannerite | 10 | HCl | 10 | 200 | 2 | | 1 hr | 0.7 | 93 | | |
| Br 2 Brannerite | 10 | HCl | 10 | 200 | — | | 1 hr | 1.2 | 88 | | |
| U6 Pitchblende | 5 | HCl | 8.75 | 140 | 0.75 | | 1 hr | 0.1110 | 97.8 | 2.2160 | |
| U7 Pitchblende | 5 | HCl | 8.75 | 140 | — | | 1 hr | 3.7260 | 26 | | |
| SA 1 Sth. Alligator Drum | 25 | HCl | 10 | 250 | 6 | | 1 hr | 19.3 | 22.8 | | 0.023 |
| SA 2 Sth. Alligator Drum | 25 | HCl | 10 | 250 | 6 | | ¼ hr | 19.1 | 23.6 | | 0.020 |
| SA 3 Sth. Alligator Drum | 25 | HCl | 10 | 250 | 6 | | ½ hr | 19.1 | 23.6 | | 0.021 |
| SA 4 Sth. Alligator Drum | 25 | HCl | 10 | 250 | 6 | | ¼ hr | 19.1 | 23.6 | | 0.020 |
| SA 5 Sth. Alligator Drum | 25 | H$_2$SO$_4$ | 10 | 250 | — | | 1 hr | 21.8 | 12.8 | | 0.147 |
| SA 6 Sth. Alligator Drum | 25 | H$_2$SO$_4$ | 10 | 250 | 6 | | 1 hr | 28.5 | | | 0.048 |
| SA 10 Sth. Alligator Drum | 25 | HCl | 13 | 250 | 12 | | 1 hr | 27.5 | | | 0.055 |
| SA 11 Sth. Alligator Drum | 25 | HCl | 5 | 250 | 12 | | 1 hr | 25.0 | | | 0.088 |
| SA 12 Sth. Alligator Drum | 25 | HCl | 5 | 250 | — | | 1 hr | 22.0 | 12 | | 0.7 |
| SA 13 Sth. Alligator Drum | 25 | H$_2$SO$_4$ | 5 | 250 | — | | 1 hr | 22.3 | 10.8 | | 0.640 |
| SA 16 Sth. Alligator Drum | 25 | H$_2$SO$_4$ | 5 | 250 | 12 | | 1 hr | 40.2 | | | 0.084 |

Table 3 shows applications of the invention and the operation of more conventional processes on uranium containing ores and the graphs, which are plots of radiation at various energy levels illustrate material from the table. In FIG. I, plot (a) is the plot of a sample from South Alligator in Australia which sample has an initial uranium content of 3.11%. Plot (b) is a plot of the residue of this sample after treatment by a conventional sulphuric acid/manganese dioxide process which is designated in the table as SA27. It will be seen that this residue still contains a large amount of radioactive lead, uranium and bismuth. This residue was after treatment for one hour. Plot (c) shows the radioactivity of the residue after treatment for only 15 minutes using the invention where the hydrochloric acid constituent was only 10%. The almost complete removal of the radioactive components can be readily appreciated.

Plot (a) in FIG. II shows the plot of the residue of a South Alligator sample after boiling for one hour in 5% sulphuric acid. Plot (b) of this graph shows the residue of the residue of plot (a) after treatment by the invention using 5% hydrochloric acid, 2.6 g fluorite with the mixture being boiled for 15 minutes. The difference in activity is very obvious.

FIG. III shows the activity of the residue of a sample of South Alligator material after boiling for one hour in 1% hydrochloric acid to which was added 12 g of fluorite and 35 g NaCl. Again, from comparison with plot (a) of FIG. I, it can be seen that the activity of the residue has been remarkably reduced.

The graphs are quite specific. Using known methods of leaching—specifically sulphuric acid—radioactivity is still considerable in the residue. Using the process as outlined and applied to such residues, the radioactivity is practically zero, even after fifteen minutes treatment. It is important to note in Table 3 that the process as outlined is superior in rapidity of uranium extraction when compared with the present known process. What is even more important is to observe that whereas under known pressures, oxidation of uranium ore is necessary (e.g. MnO$_2$) in order to extract total uranium values, (since literature reports that U$^{4+}$ is most difficult to extract) using the process as outlined there are no such difficulties. As would therefore be expected, difficult ores such as davidite and brannerite (see Table 3) are amenable to treatment. Perhaps the most important implication is that this process also has applications in the extraction of fission products from nuclear reactor waste and indeed this has been found to be completely true, so that using known separation procedures there are distinct applications within this field of technology. Samples of a uranium ore have been activated in a nuclear pile. After the treatment outlined in this invention there is almost zero $\gamma$ radioactivity.

We have also found that the invention can be used to dissolve mixed lead zinc deposits.

Although not specifically shown on normal isotopes the action of the invention on radioactive lead can be seen from the graphs. This is indicative of the value of this process in treating such ores as fine-grained lead/zinc ores that at present are beyond conventional technology.

It is possible to modify the system so as to recycle the active components. If the ferric ion is converted to ferrous ion the calcium fluoride will reform since the stability constant of Fe$^{2+}$ F$^-$ is of the same order as Ca+ +F$^-$. This can be re-used in the process or alternatively it could be recovered by known methods. Conventionally, it has been very difficult to obtain pure calcium fluoride, which is a starting material for hydrofluoric acid manufacture, as usually mineral fluorites are contaminated, for example, with siliceous material.

The invention can also give very good results when used in association with mineral deposits which have some components which themselves do not form fluoride complexes provided others do. For example, lithium normally occurs predominantly as lepidolite, spodumene, petalite and amblygonite, the first of which is lithium aluminium fluohydroxy silicate, the second and third lithium aluminium silicate and the last lithium aluminium fluophosphate. In each case the lattices are intractable but we have found that by applying the invention the aluminium reacts to form fluorides and complexes and this enables the lithium ion (Li$^+$) to become free.

Depending on the conditions, the insoluble lithium fluoride may precipitate but the ion can be retained in solution for later precipitation, either as the fluoride or, more generally, the chloride.

Similarly, such metals as gold or platinum can often be separated from an intractable lattice and can be recovered as the metal.

We have discovered that many minerals may be activated by heating so that the resultant material has a much more rapid reactivity, examples here are the dehydroxylation of clays to give active lattices or the use of known mineral inversions e.g. α→β spodumene to give crystal lattices readily attacked by the process.

This, amongst other aspects of the invention is illustrated in Table 4.

temperature and the order of reaction using sulphuric acid instead of hydrochloric acid.

In each case the reaction was carried out at boiling point and in each case, other than that using sulphuric acid and sodium chloride for one hour in the exception the reaction continued for two hours.

The invention also has major application in the field of preparation of mineral sand mixtures. In the separation of these mixtures which may include rutile, zircon, monazite and a variety of other mineral constituents in the "beach sands" industry and elsewhere, it is frequent

TABLE 3

| | Example | Weight (gms) | Acid. Vol. | % Acid | $CaF_2$ | $FeCl_3$ | Wt. Res. (gms) | % Dissolved | Flame Photometer Readings On Residues | | | Wt. Sol. (gms) | Solns. |
|---|---|---|---|---|---|---|---|---|---|---|---|---|---|
| | | | | | | | | | % Li | % K | % Na | | |
| 1 | Spodumene Pegmatite | 25 g | 250 | 25 | 6 g | — | 20.5 | 18.0 | 1.16 | 0.25 | 0.54 | 0.9 | |
| 2 | " | 25 | 250 | 12.5 | 6 g | — | 20.8 | 16.8 | 1.16 | 0.25 | 0.54 | 2.8 | |
| 3 | " | 25 | 250 | 12.5 | 12 g | — | 20.0 | 20.0 | 1.16 | 0.17 | 0.70 | 5.5 | |
| 4 | " | 25 | 250 | 12.5 | 25 g | — | 24.5 | 2.0 | 1.16 | 0.13 | 0.19 | 11.4 | |
| 5 | " | 25 | 250 | 12.5 | 12 g | 6g | 19.2 | 23.2 | 1.20 | 0.13 | 1.19 | 7.0 | |
| 6 | Ignited Spodumene Pegmatite | 25 | 250 | 12.5 | 12 g | | 18.2 | 27.2 | 0.67 | 0.08 | 0.85 | | |
| 7 | Ignited Spodumene | 25 | 250 | 12.5 | 12 g | — | 18.6 | 25.6 | 0.83 | — | 0.07 | | |
| 8 | Ignited Spodumene Pegmatite | 25 | 250 | 12.5 | 12 g | 6g | 18.4 | 26.4 | 0.63 | 0.07 | 0.83 | | |
| 9 | Ignited Spodumene | 25 | 250 | 12.5 | 12 g | 6g | 18.8 | 24.8 | 0.81 | — | 0.07 | 1.0 | |
| 10 | Ignited Spodumene Pegmatite | 25 | 250 | 25 | 12 g | 6g | 18.2 | 27.2 | 0.79 | 0.07 | 0.85 | | |
| 11 | " | 25 | 250 | 25 | 12 g | — | 18.1 | 27.6 | 0.81 | 0.07 | 0.87 | | |
| | Spodumene | 25 | 250 | 25 | 6 g | — | 22.0 | 12.0 | 3.2 | — | 0.14 | | |
| | " | 25 | 250 | 25 | — | — | 23.8 | 4.8 | 3.2 | — | 0.14 | | |
| | Original Spodumene | | | | | | | | 3.4 | — | 0.14 | | |
| | Original Spodumene Pegmatite | | | | | | | | 1.16 | 0.51 | 1.96 | | |
| | Spodumene Pegmatite | | | | | | | | 1.03 | 0.39 | 1.27 | % Li | % Na |
| 12 | Ignited Sp. Peg. at 800° C. | 10 | 100 | 12.5 | 4.8 | — | 7.6 | 24.0 | 1.16 | — | 0.45 | 0.20 | 1.40 |
| 13 | Ignited Sp. Peg. at 800° C. | 10 | 100 | 12.5 | — | — | 9.5 | 5.0 | 0.96 | 0.17 | 1.34 | 0.04 | 0.09 |
| 14 | Ignited Sp. Peg. at 1000° C. | 10 | 100 | 12.5 | 4.8 | — | 7.4 | 26.0 | 0.46 | 0.11 | 0.55 | 0.80 | 1.22 |
| 15 | Ignited Sp. Peg. at 1000° C. | 10 | 100 | 12.5 | — | — | 9.6 | 4.0 | 0.67 | 0.24 | 1.06 | 0.50 | 0.07 |
| 16 | Ignited Sp. Peg. at 1150° C. | 10 | 100 | 12.5 | 4.8 | — | 7.3 | 27.0 | 0.47 | 0.40 | 1.30 | 1.01 | 0.31 |
| 17 | Ignited Sp. Peg. at 1150° C. | 10 | 100 | 12.5 | — | — | 9.5 | 5.0 | 0.94 | 0.26 | 1.28 | 0.22 | 0.05 |
| 18 | Ignited Sp. Peg. at 800° C. | 10 | 200 | 6.25 | 4.8 | — | 8.4 | 16.0 | 1.11 | 0.12 | 0.90 | 0.15 | 0.23 |
| 19 | Ignited Sp. Peg. at 1000° C. | 10 | 200 | 6.25 | 4.8 | — | 7.6 | 24.0 | 0.37 | 0.23 | 1.05 | 0.94 | 0.89 |
| 20 | Ignited Sp. Peg. at 1150° C. | 10 | 200 | 6.25 | 4.8 | — | 7.6 | 24.0 | 0.48 | 0.37 | 1.33 | 0.90 | 0.38 |
| 21 | Ignited Sp. Peg. at 500° C. | 10 | 100 | 12.5 | 9.6 | — | 9.6 | 4.0 | 0.90 | — | 0.42 | 0.23 | 1.38 |
| 22 | Ignited Sp. Peg. at 1000° C. | 10 | 100 | 12.5 | 9.6 | — | 9.8 | 2.0 | 0.20 | — | 0.55 | % Li 0.97 | % Na 7.27 |
| 23 | Ignited Sp. Peg. at 1150° C. | 10 | 100 | 12.5 | 9.6 | — | 9.4 | 6.0 | 0.36 | 0.28 | 0.53 | 0.93 | 0.51 |
| 24 | Ignited Sp. Peg. at 1000° C. | 10 | 400 | 3.12 | 4.8 | — | 7.1 | 29.0 | 0.23 | 0.27 | 1.17 | 1.00 | 1.01 |
| 25 | Ignited Sp. Peg. at 1000° C. | .10 | 100 | | 4.8 | *10% NaCl | 14.5 | | 0.91 | 0.33 | 1.29 | 0.12 | — |
| 26 | Ignited Sp. Peg. at 1000° C. | 10 | 100 | $H_2SO_4$ 12.5 | — | — | 9.6 | 4.0 | 0.99 | 0.34 | 1.25 | 0.52 | 0.07 |
| 27 | Ignited Sp. Peg. at 1000° C. | 10 | 100 | $H_2SO_4$ 12.5 | 4.8 | 1 — | 14.3 | | 0.39 | 0.08 | 0.38 | 0.78 | 0.86 |

In each case the materials concerned are either spodumene or spodumene pegmatite and the Table shows the analysis of the original materials, the order of reaction without the addition of fluorite, the reaction with both fluorite and ferric chloride, variation of ignition occurrence to have the mineral grains encased in a sheath, continuous or otherwise, of a mixture of aluminous and ferruginous oxy hydroxy materials. Such a deposition is especially in evidence in areas where lateritisation/bauxitisation has been active. Unless such sheaths can be removed from these mineral grains, separation of the various mineral constituents using conventional procedures, such as electrostatic separation, will fail to give a reliable division into individual mineral species. It has been found that by the use of additions of fluoride or fluoride complexes—particularly calcium fluoride as the mineral fluorite—that heating a slurry for even a short time, under acid conditions, that these sheaths are removed—as would be expected because of the whole principle of the invention.

Many uranium deposits are associated with gold. We have found that after applying the process to the ore the gold is unaltered. By the addition of an oxidant e.g. ferric chloride and re-treating, all of the gold is extracted. There are known means of removal of the gold from solution.

The invention is also useful for the treatment of lateritic nickel and other ores which can be very intractable. When these ores are treated by the use of the invention the iron is removed enabling the nickel or other metal salts to be attacked.

It can also be applied to treatment of manganese ores as manganic has a high stability constant and can be used in association with manganese nodules which are generally considered intractable.

It is to be understood that the invention can be applied either to batch or continuous processes and if required the minerals being treated may be reacted on two or more occasions in different reaction vessels.

Also, the hydrolysis may be by any known method of hydrolysis, such as by evaporating part of the liquid, by adding water, boiling water or steam thereto, by forming a seed and adding this to the liquid, by evaporation to dryness and re-solution of non-hydrolyzed species, by mere evaporation, or in other ways.

The form of hydrolysis adopted may be such as to give a selective precipitation of certain values and, as can be seen from the specification, the temperature can also be selected to selectively dissolve or precipitate particular components.

Within the general criteria of the invention, many modifications may be made in the acid used, the concentration, the temperature, the time of dissolution and even the pressure, as under certain conditions a pressure above atmospheric pressure may be desirable.

I claim:

1. A method of solubilizing metal values from solid mineral containing materials including
    reacting said material at a pH which is lower than 7 in the presence of a normally insoluble source of fluoride ions or complex fluoride ions,
    the metal values to be dissolved each having a stability constant ($\log_{10}\beta_1$) higher, relative to fluoride than the cation of the source of fluoride ions or complexed fluoride ions, to thereby dissolve the metal values, and
    separating the dissolved metal values from the remaining solid material.

2. A method of solubilizing metal values from solid materials containing metal values selected from the group consisting of titanium, aluminum, cerium, tantalum, uranium, plutonium, thorium, radioactive fission products, zirconium, antimony, niobium, manganese and lead including
    reacting said material with hydrochloric acid in the presence of a normally insoluble source of fluoride ions at atmospheric pressure at a temperature less than the boiling point of a mixture of said material, hydrochloric acid and said source,
    each of the metals of said group having a stability constant ($\log_{10}\beta_1$) higher, relative to fluoride than the cation of the source of fluoride ions, to thereby dissolve the metal values, and
    separating the dissolved metal values from the remaining solid material.

3. A method of solubilizing metal values from solid materials containing metal values selected from the group consisting of aluminum, cerium tantalum, uranium, plutonium, thorium radioactive fission products, zirconium, antimony, niobium, manganese and lead including
    reacting said material with hydrochloric acid in the presence of a normally insoluble source of fluoride ions at atmospheric pressure at a temperature less than the boiling point of a mixture of said material, hydrochloric acid and said source,
    each of the metals of said group having a stability constant ($\log_{10}\beta_1$) higher, relative to fluoride than the cation of the source of fluoride ions, to thereby dissolve the metal values, and
    separating the dissolved metal values from the remaining solid material.

4. A method as claimed in claim 1 wherein the step of reacting is undertaken in the presence of hydrochloric acid.

5. A method as claimed in claim 1 wherein the source of fluoride ions or complex fluoride ions is normally insoluble fluoride.

6. A method as claimed in claim 5 wherein the normally insoluble fluoride is calcium fluoride.

7. A method as claimed in claim 6 where the calcium fluoride is mineral fluorite.

8. A method as claimed in claim 1 wherein the source of complex fluoride ions is a fluosilicate.

9. A method as claimed in claim 1 wherein during said step of reacting there is added a salt of an element which has a stability constant ($\log_{10}\beta_1$) relative to fluoride between that of the cation of the source of fluoride ions or complex fluoride ions and the metal values to be dissolved.

10. A method as claimed in claim 9 wherein the required pH is obtained by using a salt which exhibits acid properties in aqueous solution.

11. A method as claimed in claim 9 wherein the required pH is obtained by the addition of a chemical compound, which may be a gas, which itself takes no part in the reaction.

12. A method as claimed in claim 9 wherein the source of fluoride ions or complex fluoride ions is a normally insoluble fluoride.

13. A method as claimed in claim 12 wherein the normally insoluble metal fluoride is calcium fluoride.

14. A method as claimed in claim 13 wherein the calcium fluoride is fluorite.

15. A method as claimed in claim 9 wherein the source of complex fluoride ions is a fluosilicate.

16. A method as claimed in claim 9 wherein the metal salt used to obtain the required pH value is ferric chloride.

17. A method as claimed in claim 9 wherein hydrochloric acid is also added to the mixture.

18. A method as claimed in claim 1 wherein the solid mineral containing material contains metal values selected from the group consisting of titanium, aluminum, serium, tantalum, uranium, plutonium, thorium, radioactive fission products, zirconium, antiomony, niobium, manganese and lead.

19. A method as claimed in claim 18 wherein the solid mineral containing material also contains at least one element selected from the group consisting of lithium and nickel and wherein when the metal values are dissolved this frees the lithim or nickel from the lattice.

20. A method as claimed in claim 1 wherein the mixture, during reaction, is heated under atmospheric pressure at a temperature at or less than boiling.

21. A method as claimed in claim 1 wherein the reaction is effected for a period of less than one hour.

22. A method as claimed in claim 9, wherein said metal value is a zirconium.

* * * * *